United States Patent [19]

Borchard et al.

[11] 4,066,268
[45] Jan. 3, 1978

[54] DISC RECORDING PROVIDED WITH LEGIBLE MATTER

[75] Inventors: Heinz Borchard; Günter Grottker, both of Nortorf; Peter Thun, Felde, all of Germany

[73] Assignee: TED Bildplatten Aktiengesellschaft AEG-Telefunken-Teldec, Zug, Switzerland

[21] Appl. No.: 548,887

[22] Filed: Feb. 10, 1975

Related U.S. Application Data

[62] Division of Ser. No. 353,766, April 23, 1973, abandoned.

[30] Foreign Application Priority Data

Apr. 21, 1972 Germany .............................. 2219520
Apr. 21, 1972 Germany .......................... 151974[U]

[51] Int. Cl.² ............................................. G11B 3/00
[52] U.S. Cl. .................................................. 274/42 R
[58] Field of Search ........................................... 274/42

[56] References Cited

U.S. PATENT DOCUMENTS

| | | | |
|---|---|---|---|
| 648,396 | 5/1900 | Eaton | 33/81 |
| 964,685 | 7/1910 | Owen | 274/42 R |
| 2,002,393 | 5/1935 | Freed et al. | 178/6.6 B |
| 2,200,866 | 5/1940 | Thompson | 274/42 R |
| 2,664,043 | 12/1953 | Dalton | 178/6.6 B |
| 3,719,121 | 3/1973 | Okell et al. | 90/11 C |

*Primary Examiner*—Richard E. Aegerter
*Assistant Examiner*—John W. Shepperd
*Attorney, Agent, or Firm*—Spencer & Kaye

[57] ABSTRACT

In the production of disc recordings, the label portion therefor is formed by tracing a pattern of essentially circular grooves or arrays of dots and groove or dot-free areas in the location of the label portion, the grooved areas contrasting visually with the groove-free areas and the pattern being such that one type of area, preferably the groove-free areas, forms the legible characters and patterns to appear in the label portion.

4 Claims, 9 Drawing Figures

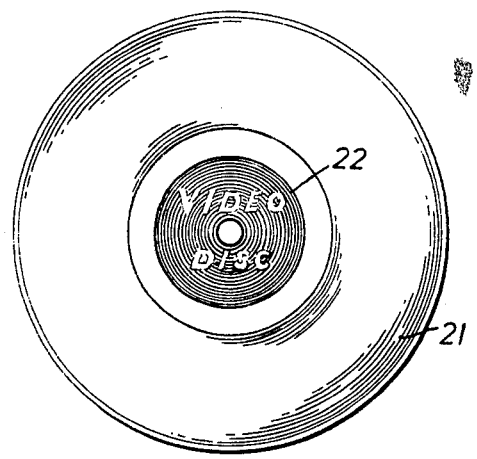
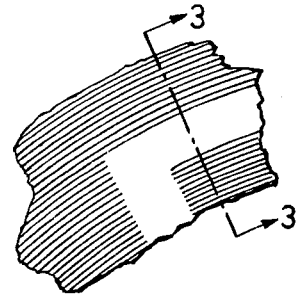
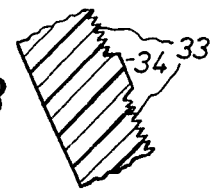
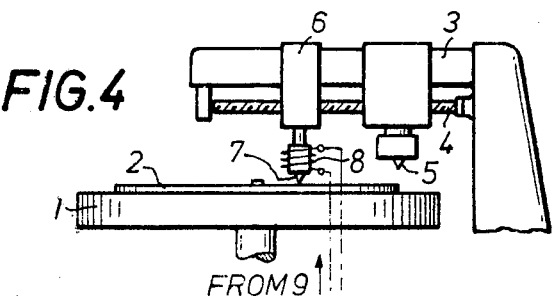
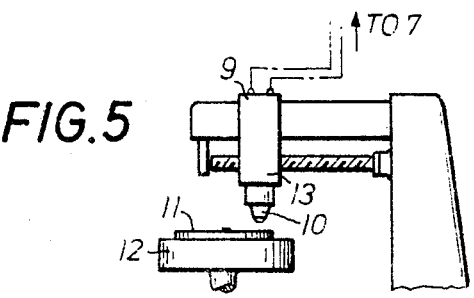

DISC RECORDING PROVIDED WITH LEGIBLE MATTER

CROSS-REFERENCE TO RELATED APPLICATION

This application is a division of Application Ser. No. 353,766, filed Apr. 23, 1973.

BACKGROUND OF THE INVENTION

The present invention relates to a method for producing legible identifying data in the label portion of disc-shaped information carriers which are provided with a groove spiral for the storage of scannable signals, the method being particularly applicable to discs formed in a preliminary stage in the manufacture of records, e.g. discs used to produce record stampers.

Information carriers are understood to be, for example, lacquer foils, such as matrices, which serve to duplicate recorded information, by means of a stamping or pressing process, i.e. in the manufacture of audio or video records.

Records are legibly or visually identified by printed paper labels at their center. These labels, in addition to containing a text information about the contents of the side of the record, also contain numerical identifications, such as stock numbers and license information. In the conventional manufacturing process for records, these labels are inserted into the pressing mold before the record is pressed and are irremovably sealed with the record material during the pressing process.

This process stresses the paper both thermally and mechanically; it must thus meet unusual requirements. It must contain only a few volatile components, in the paper and printing dye, the printing dyes must not come off, and the paper must have a particularly high tensile strength so that it will not tear during the pressing process due to shear forces in the record material.

It is furthermore necessary, when a record receives labels on both sides, to apply the labels with the paper fibers running in the same direction because otherwise a bending moment results which warps the record. In exceptional cases it is also the custom to effect the labelling by glueing the labels onto the finished record after the pressing process is completed.

A subsequent direct printing of the record surface in the label portion by means of a screen printing process is known particularly for foil-shaped pressed records. These thin plastic foils, which are generally less than 0.3 mm thick, would principally not be able to withstand, without warping, labelling with paper labels, particularly a one-sided labelling. Thus allowances must be made for the time-consuming screen printing process and the danger of subsequent damage or soiling of the finished foil by the dyes.

Finally, it is also known to effect the numerical identification during the galvanic fabrication of the matrices, mainly so as to legibly identify the galvanically made objects. This identification consists of a catalog number constituted by a sequence of numbers and letters. The matrix contains a negative representation of this identification number and the number is then transferred to the record mass during pressing. This number cannot be read too easily on the record, but serves as a distinguishing feature to the person skilled in the art. Thus this same number is also printed on the label, for example, and provides an opportunity for checking the musical content of the record against the text of the label.

The drawbacks of the known identification techniques are summarized as follows:

1. Paper labels can be used only with thicker records, not with foils of less than 0.3 mm thickness.
2. Paper labels must be manually or mechanically placed into the pressing mold with great precision.
3. The subsequent glueing constitutes an additional process step which also brings with it the danger of subsequent damage or soiling of the record.
4. Screen printing is an additional process step requiring a relatively long drying period and involves the danger of soiling of the finished audio grooves by dyes.
5. Engraved letters applied to the galvanically produced items in the conventional technique are difficult to read in the stamped surface and, due to the depth of the engraving, it would interfere with the movement of foil-type carriers during playback.

SUMMARY OF THE INVENTION

It is an object of the present invention to provide an easily readable identification in the label portion of an information carrier, in which the identification itself does not interfere with the flexibility of the foil-shaped carrier material.

Another object is to provide an identification which does not impair the accuracy of the rotating movement during playback and which is achieved by process steps which do not create the danger of reducing the quality of the signal storage on the carrier.

Finally, an object of the invention is to produce such an identification by an economical process step.

These and other objects according to the present invention are achieved by cutting a readable engraving in the form of a spiral or in the form of individual concentric rings into the information carrier as a groove or dot pattern.

The present invention is particularly applicable to foil-shaped information carriers with a high storage density which are scanned at a high speed and thus must have a very accurate rotational movement.

The formation of a groove spiral with high storage density, which is provided, for example, with a spatial, or physical, modulation in the form of a depth recording with a wavelength of $2\mu$ (microns) and an amplitude of $0.5\mu$, requires extraordinary precision during stamping of the information into the thermoplastic foil-shaped carrier.

The accuracy of the circular movement of such a groove spiral must be extremely precise during playback at high speed. Such an information carrier is used, for example, as a "picture record", or video disc.

Advisably large-area engraving with high contrast and which is as flat as possible for the information carrier is applied in a preliminary stage and this engraving is converted in a known manner by galvanic means to a negative and serves, together with the scannable groove spiral, as the stamping or pressing matrix.

Advantageously, the engraving of the line or dot pattern is effected by means of an electrically, preferably electromagnetically, movable cutting stylus, the electrical currents and/or voltages used to excite the cutting stylus being optically determined from the brightness values of an engraving pattern by means of a reading head.

The cutting stylus can also be controlled by a mechanical pickup which scans a relief-type pattern and whose scanning pulses are mechanically or electrically transferred to the cutting stylus. Also, signals from known data stores can be used to control the cutting stylus.

To produce the engraving, for example, the engraving pattern for the reading head is caused to rotate in synchronism with the turntable of a cutting machine for producing the scannable information and the reading head is advanced radially in synchronism with the radial advance of the cutting stylus for the readable engraving, the stylus being disposed above the turntable.

The same cutting stylus used to cut the modulated, scannable information spiral can be used to cut the readable engraving.

The readable engraving is advisably cut directly before or after the cutting of the scannable information on the same cutting machine.

In a further embodiment of the present invention, the readable engraving can be produced by means of a laser beam which is pulse modulated by the signal from the reading head which is scanning the engraving pattern.

Finally, the readable engraving can be produced by means of a constant beam of heat which is pulse modulated by means of an aperture controlled by the signal from the reading head scanning the engraving pattern.

BRIEF DESCRIPTION OF THE DRAWINGS

FIG. 1 is a pictorial view of an information carrier according to the invention.

FIG. 2 is a greatly enlarged detail view of part of the disc of FIG. 1.

FIG. 3 is a cross-sectional view taken along line 3—3 of FIG. 2.

FIG. 4 is an elevational view of a cutting machine for producing scannable information, an engraving device for applying a readable engraving.

FIG. 5 is an elevational view of a control device with a reading head for producing a signal for forming the engraving pattern.

DESCRIPTION OF THE PREFERRED EMBODIMENTS

Figure 6:
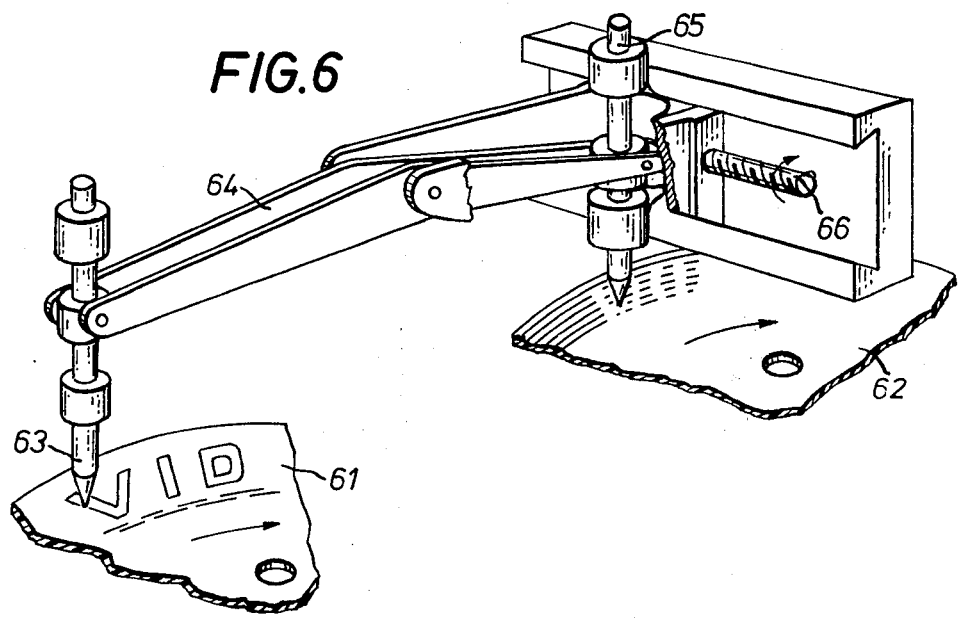
FIG. 6 is a perspective view of a mechanical pickup which scans a relief-type device and transfers the movement to a cutting stylus.

FIG. 1 illustrates a record disc which is provided with a continuous spiral 21 modulated with the information, or signal to be played back. In its central portion, the disc is provided with a label portion 22 carrying readable information produced in accordance with the invention. The disc shown could be a final record copy or a version of the disc employed in an intermediate step of the fabrication process. Thus, for example, the illustrated disc could be the engraved original or the matrix from which the stamper is molded.

FIG. 2 shows a detail of the label portion 22, to an enlarged scale. FIG. 3 shows this portion in cross section. It can there be seen that the readable characters are formed by cutting a spiral groove, or a series of concentric circular grooves 33 and by discontinuing the cutting of the groove in the regions 34 which are to constitute the readable characters. The difference in contrast between the grooved areas and the groove-free areas provide for the legibility of the resulting characters.

Such readable engravings can be made in a simple manner on the conventional cutting machine used for cutting the groove spiral 21 with a mechanically scannable signal.

Such a cutting machine already is equipped with the required drive means for rotating the original disc and the required radial advance for the cutting head. The same cutting head which cuts the scannable information could also be used to cut the readable engraving.

In contradistinction to the engraving methods used in the printing art, in which the grid pattern is principally applied in linear form, the present invention provides that each line be cut in the form of a spiral. The observable pattern is created if the cutting stylus is lifted off at certain points so that the cut is interrupted.

It is, however, more favorable to use a special cutting stylus for the readable engraving, different from that used for cutting the mechanically scannable information. The latter is usually very expensive and also has a special shape which is designed particularly for producing the modulated groove and which is not best adapted for producing a pictorial contrast.

In order to produce high contrast between the engraved surface 33 and the not engraved areas 34, shown in FIG. 3, it is important to synchronize the advance and the cutting angle of the stylus in such a manner that the entire engraved surface appears as a matte, diffusely reflecting surface in contrast to the original lacquer surface.

The arrangement shown in FIGS. 4 and 5 includes a cutting apparatus and a device for producing the control signal for cutting the record label. The cutting apparatus includes a rotating turntable 1 on which a lacquer foil 2 which is to be cut is held by means of a vacuum. A cutting head 5 is disposed above the foil to be radially displaceable in order to produce a mechanically scannable groove spiral. A feed screw 4 moves the cutting head from the outer edge of the lacquer foil toward its center so that a spiral is traced on the rotating lacquer foil. The cutting head 5 is shown in the drawing in its raised position, with the tip of the cutting stylus disposed far above the surface of the lacquer foil 2.

In the vicinity of the center of the lacquer foil, above the label area, a second cutting head 6 is disposed on guide 3. This cutting head serves to cut the readable engraving. The cutting stylus disposed in this cutting head is shown in the lowered position, with its tip located directly above the surface of the lacquer foil. All of the elements referred to can be constituted by well-known, commercially available devices. The stylii of heads 5 and 6 need only be formed in accordance with known principles to form the most suitable type of groove.

The perpendicular movement of the cutting stylus is to be effected electromagnetically in this embodiment, as is the movement of the stylus in cutting head 5. The stylus in head 6 is driven vertically by a coil 8 such that the application of current to the coil lowers the tip of the cutting stylus into the surface of the rotating lacquer foil so that the tip shaves off a chip at this point. In this way a groove spiral results. If now the current flow through coil 8 is interrupted at points corresponding to a given pattern the stylus is lifted away from the lacquer surface so that a relief-type pattern is produced.

Special contrast is achieved if the stylus is additionally caused to vibrate during the cutting process, e.g. in that it is driven with an alternating current. There then results a dot pattern of the type used in the printing art.

The control pulses for the cutting stylus come from a reading head 9, shown in FIG. 5, which is suspended from a machine element similar in construction to the guide assembly for cutting head 6. This reading head 9 has at its lower end an optic 10 for receiving a light pattern. A pattern 11 for the engraving is disposed below this optic 10 and is constituted, for example, by a photograph, a drawing or a print. This pattern rotates due to the rotation of turntable 12 in synchronism with the rotation of cutting table 1. At the same time the reading head 9 is advanced radially, in synchronism with the radial advance of the cutting head 6, from the edge of the label portion toward its center.

The brightness values detected in this way are converted into electrical pulses in a transducer 13 and are fed to coil 8. The electromagnetic forces thus produced by coil 8 drive the cutting stylus 7 up and down in correspondence with the brightness values of the engraving pattern 11. The relief cut into the lacquer surface in this manner accurately corresponds to the engraving pattern 11.

By varying the penetration depth of the cutting stylus or by the above-mentioned additional vibration with different frequencies, a further embodiment of the present invention permits the transfer not only of black and white values but also of gray values.

The embodiment shown in FIG. 6 effects a mechanical transfer of a relief-type pattern to a cutting stylus. The pattern 61 and the information carrier 62 to be engraved therewith rotate at the same speed. The scanning stylus 63 slides along a negative relief representation of the pattern and, via lever 64, moves cutting stylus 65 up and down to produce the contrast pattern on carrier 62. Otherwise the arrangement corresponds to the device described in connection with FIGS. 4 and 5, i.e. the cutting stylus 65 is moved together with the scanning stylus 63 by means of a feed screw 66 and thus a spiral-shaped engraving is produced. In a further embodiment of the mechanical transfer system, the vertical movement of the pickup 63 can of course also be converted to electrical values and transferred to the apparatus of FIG. 4.

Figure 7:
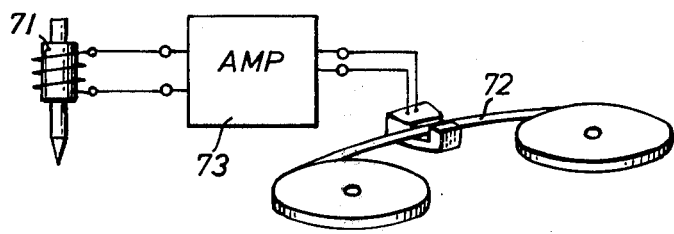
FIG. 7 is a simplified pictorial view of a data store in the form of a magnetic tape which controls a cutting stylus.

FIG. 7 shows an embodiment in which the electrical currents and/or voltages required to vertically control the cutting stylus 71 are read from a magnetic tape 72 and appropriately amplified in a transducer 73. Instead of the magnetic tape other known storage media can of course be used.

Figure 8:
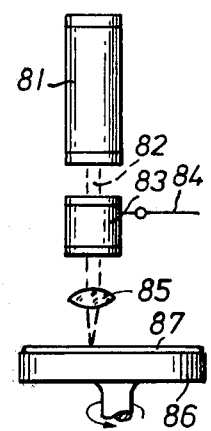
FIG. 8 is an elevational view of a laser for producing the engraving during a preliminary stage of the fabrication of an information carrier.

As shown in FIG. 8, a laser beam can also be used to cut the relief-type engraving into the information carrier. In this case the beam 82 produced in a laser 81 is modulated by a transducer 83. The transducer is controlled through the indicated line 84 by the output from a reading device. The illustrated lens 85 serves to focus the beam. The information carrier 87 to be processed is placed on the rotating turntable 86 of the device and the laser is arranged in a manner analogous to that shown in FIG. 4 for head 6, i.e. it is moved radially above the rotating information carrier 87. Transducer 83 can be constituted by any one of the many known devices available for modulating a laser beam in accordance with an electrical signal.

Figure 9:
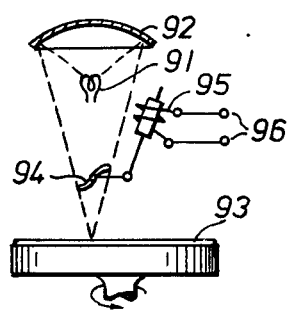
FIG. 9 is an elevational view of an embodiment using a modulated heat beam to apply the engraving in an information carrier.

FIG. 9 shows an embodiment in which the readable engraving is produced in the information carrier with the aid of a modulated heat beam. The rays from a heat source 91 are concentrated with the aid of a concave mirror 92 onto a point on the surface of the information carrier 93. A controllable aperture 94 is disposed in the beam path to vary the intensity of the heat beam. The aperture 94 may be operated, for example, electrically, via an electromagnetic control mechanism 95. The actuating pulses as in the above embodiments, may come from a reading device via lines 96.

It will be understood that the above description of the present invention is susceptible to various modifications, changes and adaptations, and the same are intended to be comprehended within the meaning and range of equivalents of the appended claims.

We claim:

1. A record disc provided with a groove containing stored signals and with a nominally flat surface portion separate from the region containing stored signals and constituting a label portion carrying readable information, the improvement wherein the surface of said disc is provided, in said label portion, with a series of substantially circular, discontinuous grooves, with the discontinuities of all of the grooves forming a pattern constituting the readable information.

2. A disc as defined in claim 1 constituted by a thin, flexible foil.

3. A disc as defined in claim 1 wherein said label portion is on the same side of said disc as said groove containing stored signals.

4. A disc as defined in claim 1 wherein said discontinuous grooves are substantially concentric to one another and to the turns of said groove containing stored signals.

* * * * *

UNITED STATES PATENT AND TRADEMARK OFFICE
CERTIFICATE OF CORRECTION

PATENT NO. : 4,066,268
DATED : January 3, 1978
INVENTOR(S) : Heinz BORCHARD et al It is certified that error appears in the above-identified patent and that said Letters Patent is hereby corrected as shown below:

Claim 1 should read as follows:

1. In a record disc provided with a groove containing stored signals and with a nominally flat surface portion separate from the region containing stored signals and constituting a label portion carrying readable information in the form of characters, the improvement wherein the surface of said disc is provided, in said label portion, with a series of substantially circular, radially spaced, discontinuous grooves, with the discontinuities of all of the grooves forming groove-free, flat surface areas presenting a pattern constituting the characters of the readable information, said groove-free areas extending between opposed borders of the characters and the areas of said label portion which are covered with said grooves having, as a result of said grooves, a matte surface which differs in contrast from said groove-free areas.

Signed and Sealed this

Twenty-second Day of August, 1989

Attest:

DONALD J. QUIGG

Attesting Officer

Commissioner of Patents and Trademarks